US008423348B2

(12) United States Patent
Rehberg et al.

(10) Patent No.: US 8,423,348 B2
(45) Date of Patent: Apr. 16, 2013

(54) PATTERN GENERATION

(75) Inventors: Charles Rehberg, Nashua, NH (US);
Krishnamurthy Satyanarayana,
Bangalore (IN); Rengarajan Seshadri,
Bangalore (IN); Vasudevan Comandur,
Bangalore (IN); Abhishek Mehta,
Bangalore (IN); Amit Goel, Bangalore
(IN)

(73) Assignee: Trigent Software Ltd., Bangalore (IN)

( * ) Notice: Subject to any disclaimer, the term of this patent is extended or adjusted under 35 U.S.C. 154(b) by 1293 days.

(21) Appl. No.: 11/451,239

(22) Filed: Jun. 10, 2006

(65) Prior Publication Data

US 2007/0213973 A1 Sep. 13, 2007

(30) Foreign Application Priority Data

Mar. 8, 2006 (IN) .............................. 407/CHE/2006

(51) Int. Cl.
*G06F 17/27* (2006.01)
*G06F 17/21* (2006.01)
*G10L 15/04* (2006.01)
*G10L 15/28* (2006.01)
*G10L 15/00* (2006.01)
*G10L 21/00* (2006.01)

(52) U.S. Cl.
USPC ................. 704/9; 704/10; 704/251; 704/255; 704/257; 704/270; 704/270.1; 704/272; 704/274

(58) Field of Classification Search ................ 704/1–10, 704/251, 255, 257, 270, 270.1, 272, 274; 707/776
See application file for complete search history.

(56) References Cited

U.S. PATENT DOCUMENTS

| 4,635,199 | A | * | 1/1987 | Muraki ............................ 704/2 |
| 5,418,716 | A | * | 5/1995 | Suematsu ........................ 704/9 |
| 5,424,947 | A | * | 6/1995 | Nagao et al. .................... 704/9 |
| 5,671,425 | A | * | 9/1997 | Suematsu ........................ 704/9 |
| 6,233,545 | B1 | * | 5/2001 | Datig .............................. 704/2 |
| 7,346,490 | B2 | * | 3/2008 | Fass et al. ....................... 704/7 |
| 7,657,424 | B2 | * | 2/2010 | Bennett .......................... 704/9 |
| 7,725,307 | B2 | * | 5/2010 | Bennett .......................... 704/9 |
| 7,962,326 | B2 | * | 6/2011 | Tsourikov et al. ............... 704/9 |
| 2002/0107827 | A1 | * | 8/2002 | Benitez-Jimenez et al. ..... 706/59 |
| 2003/0004915 | A1 | * | 1/2003 | Lin et al. ........................ 707/1 |
| 2003/0120640 | A1 | * | 6/2003 | Ohta et al. ...................... 707/3 |
| 2004/0243531 | A1 | * | 12/2004 | Dean ............................. 706/55 |
| 2006/0106594 | A1 | * | 5/2006 | Brockett et al. ................. 704/9 |
| 2006/0242101 | A1 | * | 10/2006 | Akkiraju et al. ................. 707/1 |
| 2006/0245641 | A1 | * | 11/2006 | Viola et al. .................... 382/155 |
| 2006/0253274 | A1 | * | 11/2006 | Miller ............................ 704/9 |
| 2006/0253476 | A1 | * | 11/2006 | Roth et al. .................... 707/100 |
| 2007/0073533 | A1 | * | 3/2007 | Thione et al. ................... 704/9 |
| 2007/0106494 | A1 | * | 5/2007 | Detlef et al. .................... 704/9 |

(Continued)

*Primary Examiner* — Edgar Guerra-Erazo
(74) *Attorney, Agent, or Firm* — Ash Tankha; Lipton, Weinberger & Husick

(57) ABSTRACT

A method and system is disclosed herein for generating a plurality of equivalent sentence patterns from a declared sentence pattern for a specific language. The declared pattern is fed into a pattern selector. The pattern selector reads a predetermined library of equivalent pattern sets and selects an equivalent pattern set for the declared pattern. The selected equivalent pattern set corresponds to the declared pattern and represents a set of equivalent declared patterns. The set of equivalent declared patterns and the declared pattern are fed to a rules generator. The rules generator outputs executable semantic pattern recognition rules. The reader module, using the generated executable semantic pattern recognition rules, reads the given information source to determine the information of interest.

6 Claims, 7 Drawing Sheets

U.S. PATENT DOCUMENTS

2007/0233458 A1* 10/2007 Sakao et al. ............... 704/9
2008/0033715 A1* 2/2008 Barklund et al. ............ 704/9
2010/0070448 A1* 3/2010 Omoigui ................. 706/47
2010/0070450 A1* 3/2010 Barker .................... 706/48

* cited by examiner

| WVA | Reader | Report |

Recent Files

Current File

Patterns

LAGOS, Nigeria - The deadly bird flu virus has been detected on a large commercial chicken [H5N1] [Let the System Do It...] outbreak in Africa, the World O [Select from Dictionary...] Wednesday. [Select from Previously Defined...] [Define as New Word or Phrase -->]

The outbreak appears to be re[Edit Properties...] infections have been reported, Nigeria said the outbreak was on a farm in Jaji, a village in the northern state of Kaduna. Agriculture Minister Adamu Bello told reporters in Abuja that the deadly strain of the virus was detected in samples taken Jan. 16 from birds on the farm.

"The significance is that it's a completely new continent that we need to be looking at," said Alex Thiermann, an expert for the World Organization for Animal Health, known as the OIE, said of the virus' arrival on the world's poorest continent.

All 46,000 chicken, geese and ostriches on the Nigerian farm have been killed and their bodies disposed of, Thiermann said. Nigerian authorities have banned the movement of birds and people off the farm.

Officials also are investigating whether birds were transferred to other farms in the past 21 days, and they, too, are being quarantined, he Thiermann said it was not yet known how the virus entered Nigeria, but migratory H5N1 detected [Identify Importance]
virus wa[Edit Pattern]
birds tra[New Pattern]
outbrea[Delete Pattern]
banned

[Clear All] [Generate and Test Reader] [Save Patterns]

FIGURE 4A

PATTERN GENERATION

BACKGROUND OF THE INVENTION

This invention in general relates to information analysis and specifically relates to a system and method for generating sentence patterns used for determining the information of interest of an end user.

The world-wide web contains billions of web pages of information. In addition, a large amount of information is also stored on enterprise systems, public and commercial databases, etc. As the number of information sources increase, identifying or finding the information of interest is requiring more time and becoming increasingly difficult for a user. There is a market need to find and present the information of interest to a user from one or more of the aforementioned sources of information.

In order to display to the user his/her information of interest, culled from a body of source information in an acceptable amount of time, co-pending patent application titled "Capturing reading style", Patent application No. 1819/CHE/2005 filed in India on Dec. 13, 2005 illustrates a method of capturing the reading style of a user, wherein the reading style is a set of one or more declared patterns. A declared pattern contains a set of source components. The user declares patterns from source components. There are different kinds of source components such as sentences, paragraphs, etc.

In the method and system disclosed herein, a declared pattern is used to determine the information of interest from an information source. There is unsatisfied market need to fully expand and apply all the manifestations of the declared pattern of an end user's reading style. There is also a need to generate a set of language-specific sentence patterns, specific to the reading style of a user, that would expand upon the declared sentence pattern, and that is used for recognizing a larger number of matching word patterns in the information source, thereby providing the ability to comprehensively and accurately determine the information of interest from an information source.

Reference resolution is performed to remove ambiguity and clearly define words such as "The President", he, she, it, they, etc. There is an unmet market need to resolve references without a significant consumption of computing resources for information processing. Therefore references need to be resolved at run time without the use of more traditional natural language processing techniques.

SUMMARY OF THE INVENTION

The method and system disclosed herein generates sentence patterns from a declared pattern.

The declared pattern derived from the reading style of an end user, along with language specific information, is used to determine the information of interest from information sources, using the various combinatorics of the language and the syntactic context, such as reference resolution and semantic context, and the presence of certain semantic items. This invention provides a method and system of generating a plurality of equivalent sentence patterns from a declared sentence pattern for a specific language. The declared pattern is fed into a pattern selector. The pattern selector reads a predetermined library of equivalent pattern sets and selects an equivalent pattern set for the declared pattern. The set of equivalent declared patterns and the declared pattern are fed to a rules generator. The rules generator outputs executable semantic pattern recognition rules. The reader module, using the generated executable semantic pattern recognition rules, reads the given information source to determine the information of interest.

Therefore, it is an object of the invention to generate equivalent sentence patterns for a given declared sentence pattern, and apply the equivalent sentence patterns to determine the information of interest from information sources.

It is also an object of the invention to decompose complex sentences into simple sentences.

It is also an object of the invention to resolve references.

BRIEF DESCRIPTION OF THE INVENTION

The foregoing summary, as well as the following detailed description of embodiments, is better understood when read in conjunction with the appended drawings. For the purpose of illustrating the invention, there is shown in the drawings exemplary constructions of the invention; however, the invention is not limited to the specific methods and instrumentalities disclosed.

FIG. 4A illustrates of an example of a computer implemented method of capturing patterns.

DETAILED DESCRIPTION OF THE INVENTION

Figure 1:
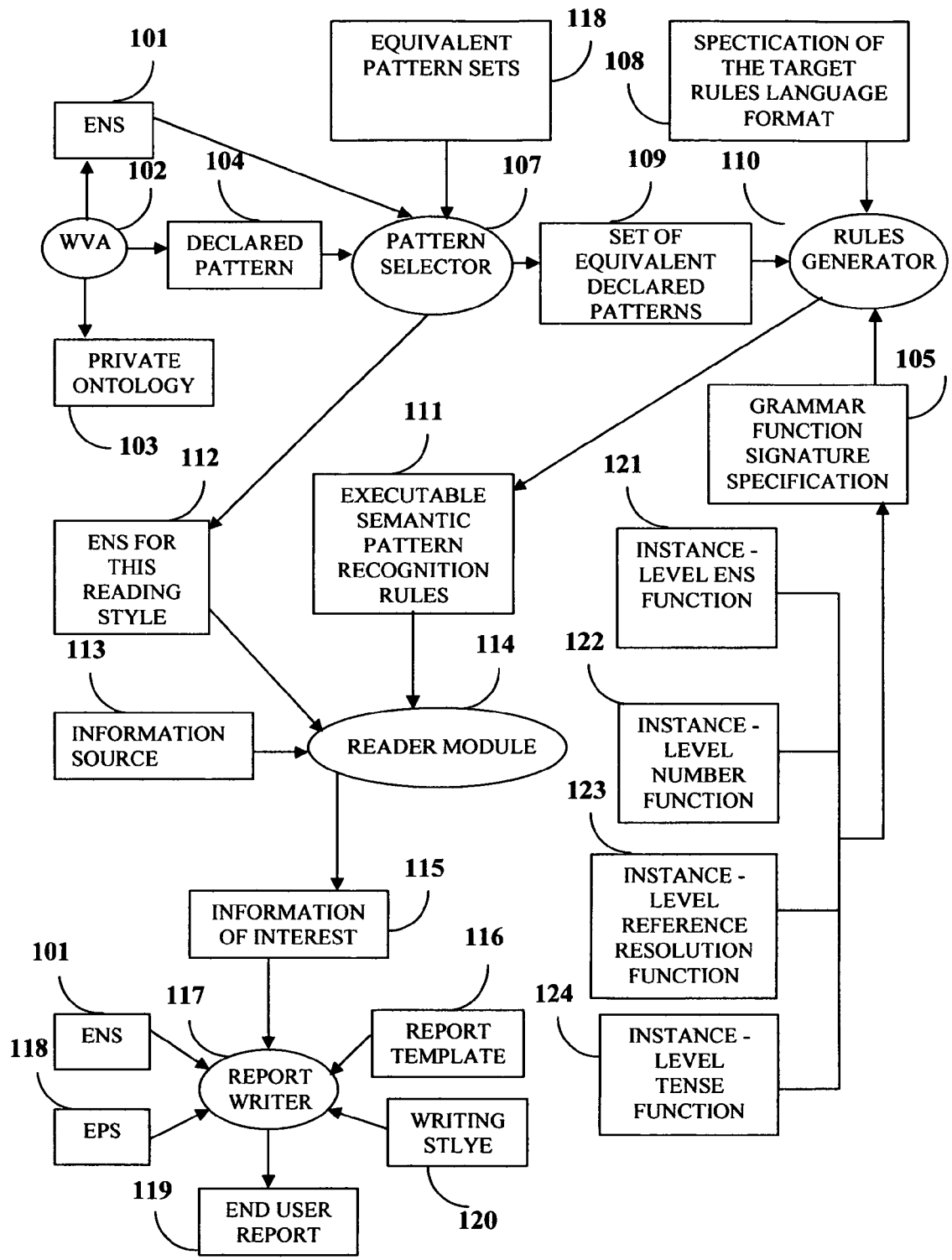
FIG. 1 illustrates the creation and application of equivalent patterns to determine the information of interest.

Definitions:

The definitions of the technical terms used herein are provided below.

Declared pattern (DP): A pattern that matches words found in a sentence.

Document: A document is an electronic file, comprising one or more of the following: text, pictures, audio and video.

Fact: A fact is an instance of a concept. For example, "Andre Agassi" is a fact in the realm of known "sportsmen".

Generated LS reading pattern recognition rules: A software code or rules in a format that can be executed by a rules-base engine to act as the reader module.

Instance-level ENS function: An interface definition to a function that handles the language specific equivalent name sets (LS ENS).

Instance-level number function: An interface definition to a function that handles singular and plural forms of a word.

Instance-level reference resolution function: An interface definition to a function that handles the resolution of pronouns such as he, she, it, they, etc.

Instance-level tense function: An interface definition to a function that handles the different forms of a verb such as past, present, future, etc.

Information of interest: The relevant information desired in the LS information source.

Language-specific equivalent pattern sets (LS EPS): Sets of equivalent patterns that represent different ways of saying the same thing.

Language-specific equivalent name set (LS ENS): Set of words that have the same meaning.

Language specific (LS) grammar function signature specifications: The interface definitions to functions that perform instance-level pattern matching for equivalent name sets.

Language specific information source: Information, for example, one or more source documents, that is to be read.

Language-specific pattern preprocessor specification: Specifies the method of resolving references and reducing compound sentences to simple sentences before applying the generated LS reading pattern recognition rules.

LS reading syntactic context processing rules (a software code): Language specific rules for preprocessing the LS information source to allow the generated LS reading pattern recognition rules (rules code) to match.

LS WV-specific sentence patterns: Generated patterns that are able to recognize a large number of matching word patterns found in language specific information sources.

Private ontology: Comprises semantic items and their interrelationships. The private ontology is structured specifically to the view of a user. A private ontology comprises definitions of semantic items in a domain of interest of the user and defines the relationship between the semantic items.

Reader module: A system and process for scanning the LS information source to produce the information of interest (IOI) by using the generated LS reading pattern recognition rules (rules code), LS reading syntactic context processing rules (code), and LS ENS.

Reading pattern generator: A method and system that generates a set of language-specific world view-specific sentence patterns that expand upon the declared sentence pattern, thereby recognizing a larger number of matching word patterns in an information source.

Rules generator: Generates language specific rules used for processing the information source.

Resolving reference resolution: A specification of the algorithm to determine what the reference words such as he, she, it, that, those, etc., refer to.

Reading style: A set of one or more declared patterns. A declared pattern contains a set of source components. A pattern identifies a specific semantic item. The user declares patterns from source components and thereby captures the reading style. There are different kinds of source components such as sentences, paragraphs, etc.

Reading plan: The reading plan is a set of steps defined by the user that identifies and controls the evaluation sequence of a source document. The reading plan allows for efficient processing of source documents by reducing the amount of data to be evaluated.

Semantic item: A semantic item is one of the following: a thing, a type of thing, a characteristic, or a relationship between things and types of things.

Syntactic unit: A syntactic unit is a unit resulting from a structural partitioning of a document. For example, in a text based document, the syntactic unit can be a word, sentence, paragraph, etc.

Worldview: The worldview of the user comprises the reading style, reading plan and private ontology of the user. It reflects the logic and structure with which a user comprehends a document.

World view acquisition (WVA): A process for interacting with a user to produce declared sentence patterns, reading plans, and private ontologies.

FIG. 1 illustrates the creation and application of set of equivalent declared patterns to determine the information of interest. The world view acquisition (WVA) 102 process generates the declared pattern 104 and private ontology 103. The WVA process 102 is described in detail in co-pending patent application titled "Capturing reading style". The declared pattern 104 is fed into a pattern selector 107. The pattern selector 107 reads a predetermined library of equivalent pattern sets 118 and selects one of the equivalent pattern sets 118 for the declared pattern 104. Each of the components of the set of selected equivalent pattern sets 118 is substituted with the content of the declared pattern 104 to create a corresponding set of equivalent declared patterns 109. Equivalent name sets (ENS) 101 are predetermined and used in the aforementioned substitution with the content of the declared pattern 104. The equivalent pattern sets 118 are pattern templates. For example, the declared pattern 104 could state "President Bush traveled to China" and an equivalent pattern set 118 could contain an equivalent pattern for "The $45^{th}$ President visited China". The set of equivalent declared patterns 109 and declared pattern 104 are fed to a rules generator 110. The "specification of the target rules language format" module 108 defines the procedure for the application of the rules in the rules generator 110. The generated patterns 107 and the declared pattern 104 are converted into executable rules by the rules generator 110. The grammar function signature specification 105 applies grammar logic to the rules generator 110. The grammar function signature specification 105 comprises an instance level ENS function 121, instance level number function 122, instance level reference resolution function 123 and instance level tense function 124. The instance-level ENS function 121, is the interface definition to a function that handles the language specific equivalent name sets (LS ENS). The instance-level number function 122 is the interface definition to a function that handles singular and plural forms of a word. The instance-level reference resolution function 123 is the interface definition to a function that handles the resolution of pronouns such as he, she, it, they, etc. The instance-level tense function 124 is an interface definition to a function that handles the different forms of a verb such as past, present, future, etc.

The rules generator 110 outputs executable semantic pattern recognition rules 111. The reader module 114, using the generated executable semantic pattern recognition rules 111, and the equivalent name sets for the reading style 112, reads the given information source 113 to determine the information of interest 115. The information of interest 115 is then fed into a report writer 117.

The report writer 117 processes the information of interest 115 by applying the equivalent name set (ENS) 101 and equivalent pattern set 118. The equivalent name set 101 and equivalent pattern set 118 generate equivalent representations of the information of interest 115. The report template module 116 and writing style module 120 render the equivalent representation of the information of interest 115 in the form of an end user report 119. The end user report 119 is in a report format specified by the report template module 116 and rendered in the preferred writing style 120 of the end user. The report template 116 defines the structure of the report, while the writing style module 120 presents the report in the preferred writing style 120 of the user.

An example of the structure of a report and writing style is briefly outlined below. For a marketing monthly summary report provided for the marketing manager of a company, the structure of the report could comprise a first section on the new clients, a second section on new product introductions, followed by a third section on sales targets. The writing style, renders the report containing these three sections displayed in a cascaded form, surrounded by market share pie charts, and the prose with headings such as "target market", "competitors", etc. The pattern substitution process of this invention does not require significant computing resources, as there are a finite and manageable number of equivalent declared patterns in the set of equivalent declared patterns 109 that is being processed, for example, there could be about forty patterns that represent multiple combinations of pattern variables. Examples of pattern variables include subject, verb, object, etc. There are different types of pattern variables that provide multiple combinations of patterns, including, but not restricted to, linking verbs such as "be", intransitive verbs, action words transitive verbs, noun phrases, etc. Each combination of these pattern variables represent one instance in a set of equivalent declared patterns 109.

A pattern can be represented as a composition of equivalent name sets 101. For example, consider the pattern "George Bush travels to China". In this pattern, ENS1 is "George Bush", or "President Bush", or "President", etc.; ENS2 is "travels", or "visited", etc.; and ENS3 is "China", or "Peoples Republic of China", etc. Now, consider linking ENS1, ENS2 and ENS3 in multiple combinatorics. We arrive at the following new combination: "ENS 3 followed by ENS2 followed by ENS 1", i.e. "China was visited by George Bush". This pattern contains a changed tense. A plurality of equivalent declared patterns are constructed with due consideration to the impact of tense, gender, conditions, etc. The equivalent declared patterns comprise a set of equivalent declared patterns 109. In general, the equivalent declared patterns in the set of equivalent declared patterns 109 provide multiple representations of the same sentence or multiple representations of the intended meaning of a collection of words.

The following example illustrates the generation of equivalent pattern sets. An equivalent pattern set archetype comprises a specific combination, or a "signature" of one or more of the following, but not restricted to, roles and parts of speech, tenses, number pattern, etc. The different types of roles and parts of speech, tenses, number pattern are listed below.
1. Roles and Parts of Speech (POS)
    a. NP=noun phrase
        i. NP1 is Subject
        ii. NP2 is Direct Object
        iii. NP3 is Indirect Object
    b. V=verbs
        i. V-be=verb of being
        ii. LV=linking verb
        iii. V-int=intransitive verb
        iv. V-tr=transitive verb
    c. ADV/TP=adverbial of time or place
    d. ADJ=adjective
2. Tenses
    a. Past
    b. Present
    c. Future
    d. Past Perfect
    e. Present Perfect
    f. Future Perfect
    g. Past Progressive
    h. Present Progressive
    i. Future Progressive
    j. Past Perfect Progressive
    k. Present Perfect Progressive
    l. Future Perfect Progressive
3. Number
    a. Singular
    b. Plural
4. Pattern=PatternItem . . .
    a. PatternItem=(
        i. ensID,
        ii. {npID|verbID|advID|adjID},
        iii. {tenseID|numberID|*},
        iv. {genderID|*})
5. EPS include (but are not limited to) the following archetypes (see EPS signatures):
    a. NP1 V-be ADV/TP
    b. NP1 V-be ADJ
    c. NP1 V-be NP1
    d. NP1 LV ADJ
    e. NP1 LV NP1
    f. NP1 V-int
    g. NP1 V-tr NP2
    h. NP1 V-tr NP2 NP3
    i. NP1 V-trNP2 ADJ
    j. NP1 V-tr NP2 NP2
    k. V-be ADV/TP
    l. V-be ADJ
    m. V-be NP1
    n. LV ADJ
    o. LV NP1
    p. V-tr NP2
    q. V-tr NP2 NP3
    r. V-tr NP2 ADJ
    s. V-tr NP2 NP2

EXAMPLE 1

The following example illustrates the derivation of generated patterns, in this case EPS1, and EPS2 from a declared pattern, for the selected exemplary text "individuals planted a tree".
1. Selected in the Text at line 5: "individuals planted a tree"
    a. Map the variables in the selected text to equivalent name sets.
        i. "individuals" be an entry in ENS1
        ii. "planted" be an entry in ENS2
        iii. "tree" be an entry in ENS3
    b. The Declared Pattern has the following signature:
        i. (ENS1, NP1, Plural) followed by
        ii. (ENS2, V-tr, Past) followed by
        iii. (ENS3, NP2, Singular)
    c. The Equivalent Pattern Set (say EPS1) has the following signature:
        i. EPS1(NP1, V-tr, NP2)
        ii. EPS1 Members include:
            1. MEM1=A:NP1(Plural) B:V-tr (Past) C:NP2 (Singular)
            2. MEM2=C:NP1(Singular) "was" B:V-tr(Past) "by" A:NP2(Plural)
                a. e.g. The tree was planted by individuals
            3. MEM3=A:NP1(Plural) "will" B:V-tr(Present) C:NP2(Singular)
                a. e.g. "Individuals will plant the tree"
            4. MEM4=A:NP1(Plural) "are" B:V-tr(Present-Progressive) C:NP2(Singular)
                a. e.g. "Individuals are planting the tree"
        Additional EPS Members are not shown as this is intended to only be an illustrative example.
    d. The Generated Patterns based on the Declared Pattern are:
        i. (ENS3, NP1, Singular) "was" (ENS2, V-tr, Past) "by" (ENS1, NP2, Plural)
        ii. (ENS1, NP1, Plural) "will" (ENS2, V-tr, Present) (ENS3, NP2, Singular)
        iii. (ENS1, NP1, Plural) "are" (ENS2, V-tr, Present-Progressive) (ENS3, NP2, Singular)

The following example illustrates the derivation of three generated patterns, in this case EPS 1, and EPS2 from a declared pattern, for the selected exemplary text "planting of trees".
   a. Map the variables in the selected text to equivalent name sets.
      i. "planting" be an entry in ENS1
      ii. "trees" be an entry in ENS2
   b. The Declared Pattern is:
      i. (ENS1, V-tr, PresentProgressive) followed by
      ii. (ENS2, NP2, Plural)
   c. The Equivalent Pattern Set (say EPS2) has the following signature:
      i. EPS1(V-tr, NP2)
      ii. EPS1 Members include:
         1. MEM1=A:V-tr (PresentProgressive) of B:NP2 (Plural)
         2. MEM2=B:NP1(Plural) "were" A:V-tr(Past)
            a. e.g. "trees were planted"
         3. MEM3=B:NP1(Plural) "will" "be" A:V-tr(Past)
            a. e.g. "Trees will be planted"
         4. MEM4=B:NP1(Plural) "are" "being" B:V-tr(Past)
            a. e.g. "Trees are being Planted"
      iii. Additional EPS Members are not show as this is intended to be illustrative.
   d. The Generated Patterns based on the Declared Pattern are:
      i. (ENS2, NP1, Singular) "were" (ENS1, V-tr, Past)
      ii. (ENS2, NP1, Plural) "will" "be" (ENS1, V-tr, Past)
      iii. (ENS2, NP1, Plural) "are" "being" (ENS1, V-tr, Past)

The elements of the set of equivalent declared patterns 109 have a one to one relationship with semantic items in the private ontology 103. Hence, for a given element of the set of equivalent declared patterns 109, there is a singular equivalent name set identified from the multiple equivalent name sets 101 contained in the equivalent name set module. Thereby, patterns of semantic items are created using the set of equivalent declared patterns 109 and equivalent name sets 101.

Figure 2:
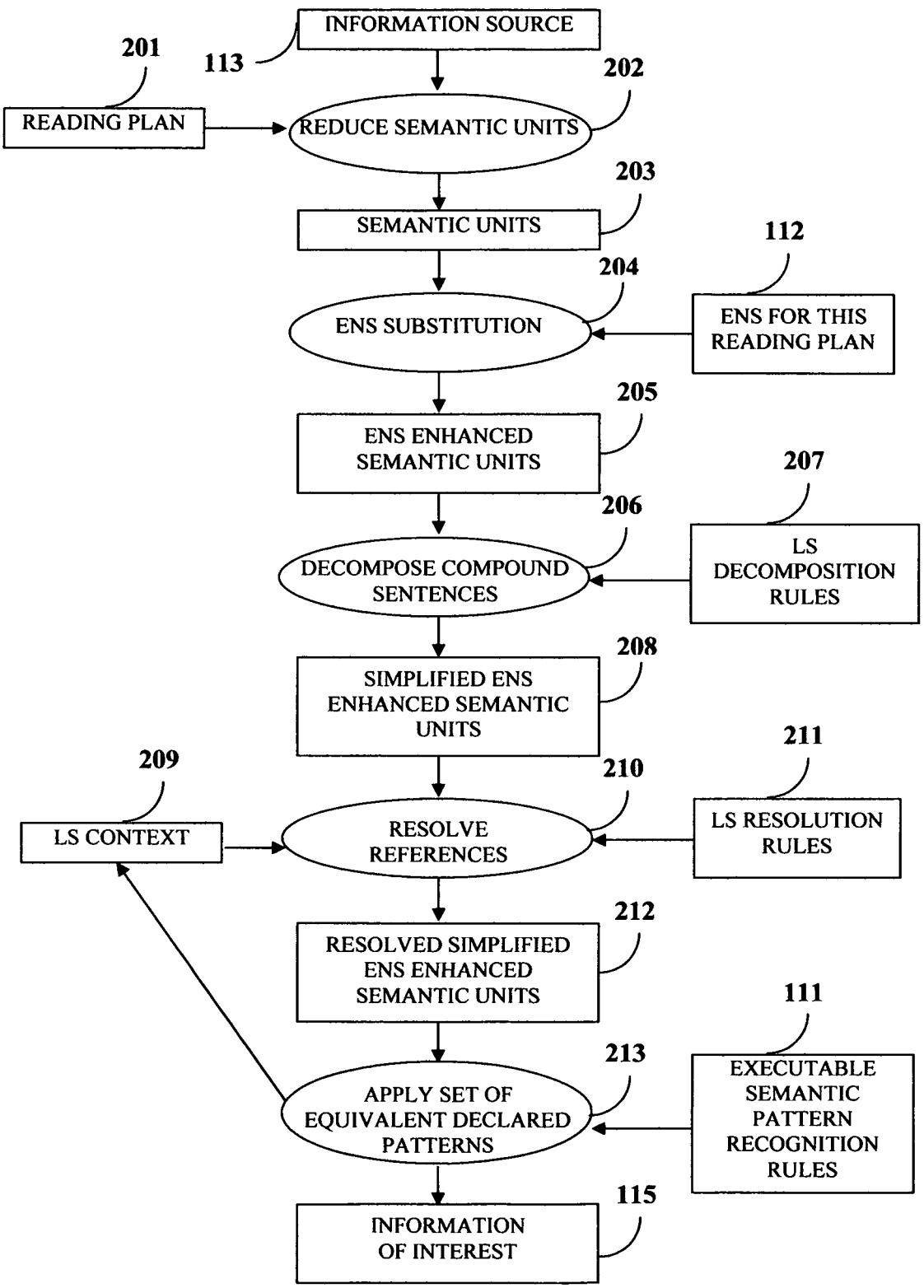
FIG. 2 illustrates the processes performed by the reader module.

FIG. 2 illustrates the processes performed by the reader module. The reading plan 201 specified by the end user, identifies the section of the information source 113 that requires processing. Next, the identified section of the information source 113 is reduced 202 to semantic units (203), such as words, phrases, sentences, etc. The equivalent name sets 101 are then generated and substituted 204 for each of the identified semantic units 203 to create ENS enhanced semantic units 205. The compound sentences of the ENS enhanced semantic units 205 are decomposed 206 to arrive at simplified ENS enhanced semantic units 208. Consider the following example of decomposition of the compound sentence "Joe and Bob bought a Lexus and a Honda". This compound sentence is processed and reduced into simple sentences where pattern matching can be performed. The simple sentences formed are "Joe bought a Lexis", "Joe bought a Honda", "Bob bought a Lexis" and "Bob bought a Honda".

The method disclosed herein provides a method of resolving references 210, for example, determining the person representing "President". The resolve reference process 210 is applied to resolve reference issues if there is a previous sentence that can help in the resolution of phrases or words such as "he", "she", "it", "they", etc. If the information under consideration for resolution does not have any preceding text, then the resolve reference process 210 is not applied. The context information 209 is also generated by the application 213 of set of equivalent declared patterns 109. As each equivalent declared pattern is searched for in the information source 113, the context information 209 is also generated as a result of matching the variables in the equivalent declared pattern. As the context information 209 is available at the stage of reference resolution 210, the resolve references process 210 generates the resolved simplified ENS enhanced semantic units 212. The set of Equivalent declared patterns 109 are applied 213 to the resolved simplified ENS enhanced semantic units 212 to determine the information of interest 115 from the information source 113. The executable semantic pattern recognition rules are applied 213 for a given identified context, and this application of executable semantic pattern recognition rules 111 is recorded and is reused if the same context information 209 were again encountered in future. The language specific (LS) resolution rules 211 (code) are rules that recognize the occurrence of words such as—he, she, it . . . etc., and uses the context to resolve the reference.

Figure 3:
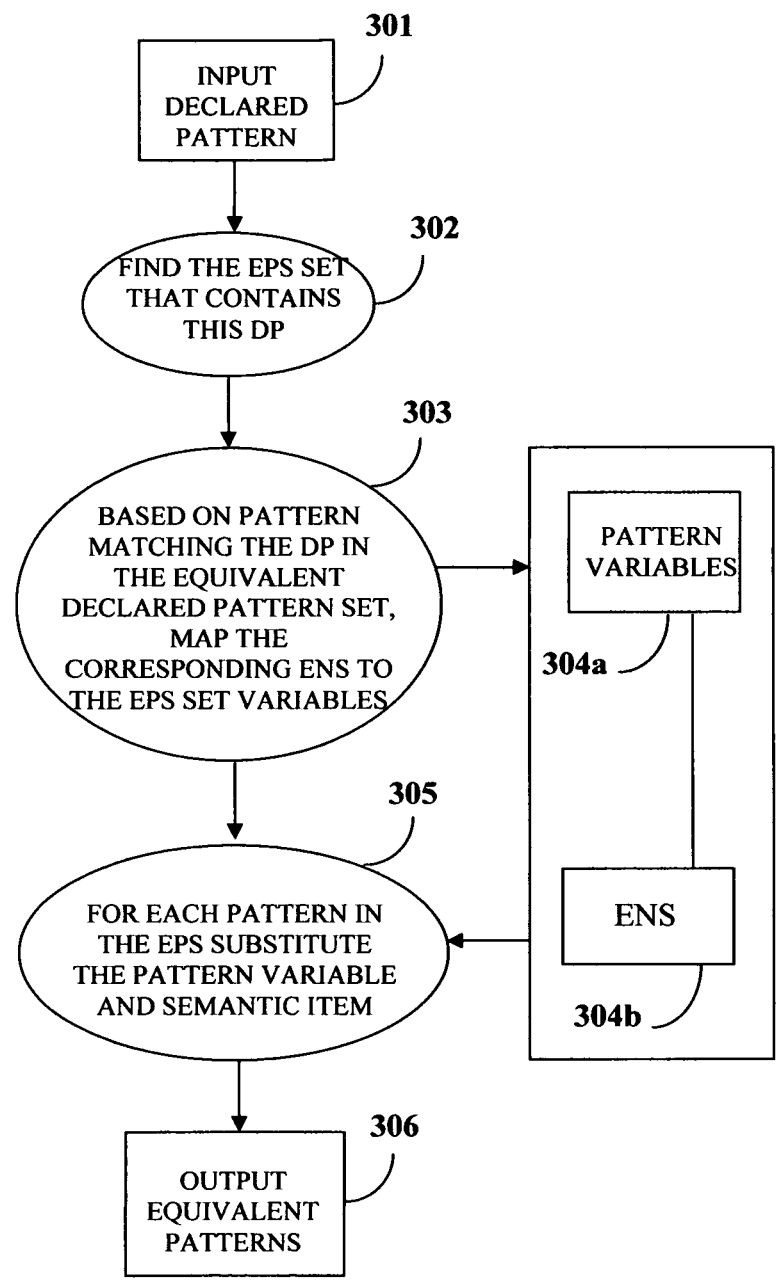
FIG. 3 illustrates the processes accomplished within the pattern selector.

FIG. 3 illustrates the processes accomplished within the pattern selector 107. A declared pattern 104 is provided 301 as input. A set of equivalent declared patterns 109 are identified 302 from the equivalent pattern sets 118 that matches the input declared pattern 104. The set of equivalent declared patterns 109 contain equivalent declared patterns. Each of the equivalent declared patterns comprise pattern variables arranged in a certain sequence. The equivalent name sets 101 to the corresponding equivalent pattern set variables of the set of identified equivalent declared pattern specification 304*a*, 304*b* is mapped 303. Once the mapping is created, each pattern in the equivalent pattern set is processed and the pattern variables is substituted with corresponding equivalent name sets 305 to output the equivalent patterns 306.

FIG. 3 illustrates the processes accomplished within the pattern generator. An equivalent pattern is identified in the pattern specification set 302 that matches the input declared pattern 301. Each equivalent pattern 109 set contains pattern variables arranged in a certain sequence. The equivalent name sets to the corresponding equivalent pattern 303 set variables of the identified equivalent pattern specification 304*a*, 304*b* is mapped. Once the mapping is created, each pattern in the equivalent pattern set is processed and the pattern variables is substituted with corresponding equivalent name sets 305 to output the equivalent patterns 306.

The foregoing examples have been provided merely for the purpose of explanation and are in no way to be construed as limiting the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

FIG. 4A illustrates of an example of a computer implemented method of capturing patterns. The menu drop provides features such as "let the system do it", "select from dictionary", etc. If "let the system do it" option is selected, the patterns are automatically selected by the system. The selected patterns are stored in the right hand section named "Patterns". These patterns can be edited, their importance identified, new patterns introduced, and existing patterns can be deleted.

Figure 4B:
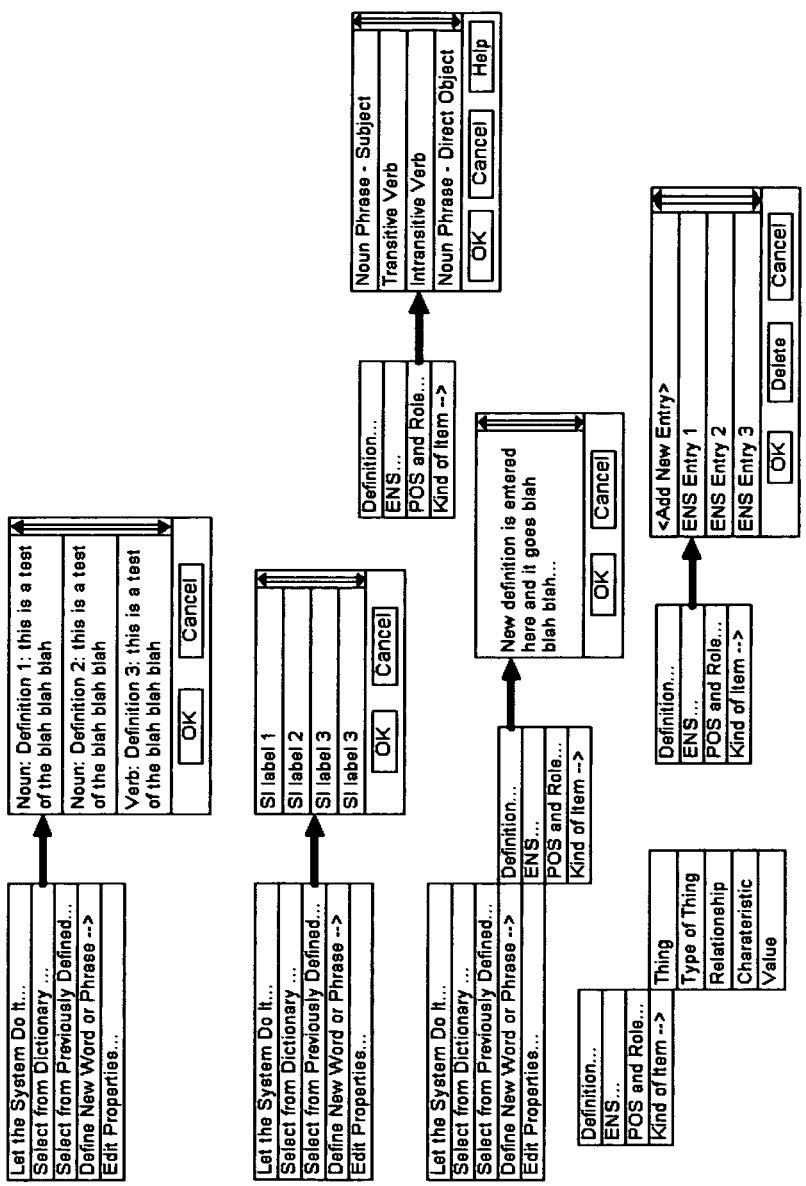
FIG. 4B illustrates the detailed menu drop options available for recording patterns.

FIG. 4B illustrates the detailed menu drop options available for recording patterns. On or more definitions can be selected from a dictionary. A previously defined semantic item (SI) can be selected. A new word or phrase can be defined. The kind of item is one of the following: Thing, type of thing, relationship, characteristic or value. The ENS is selected from one of the available ENS entries. The appropriate parts of speech (POS) and role is chosen.

Figure 4C:
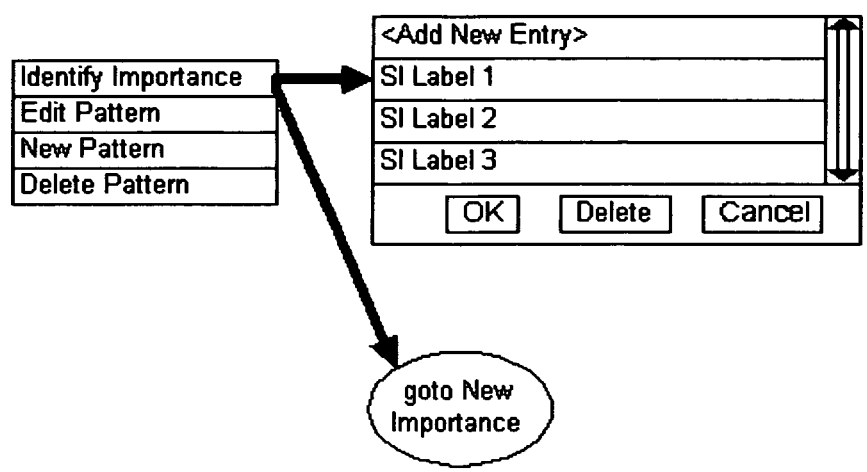
FIG. 4C shows the selection of an importance a semantic item label 1.

FIG. 4C shows the selection of an importance, i.e. a semantic item (SI) label 1.

Figure 4D:
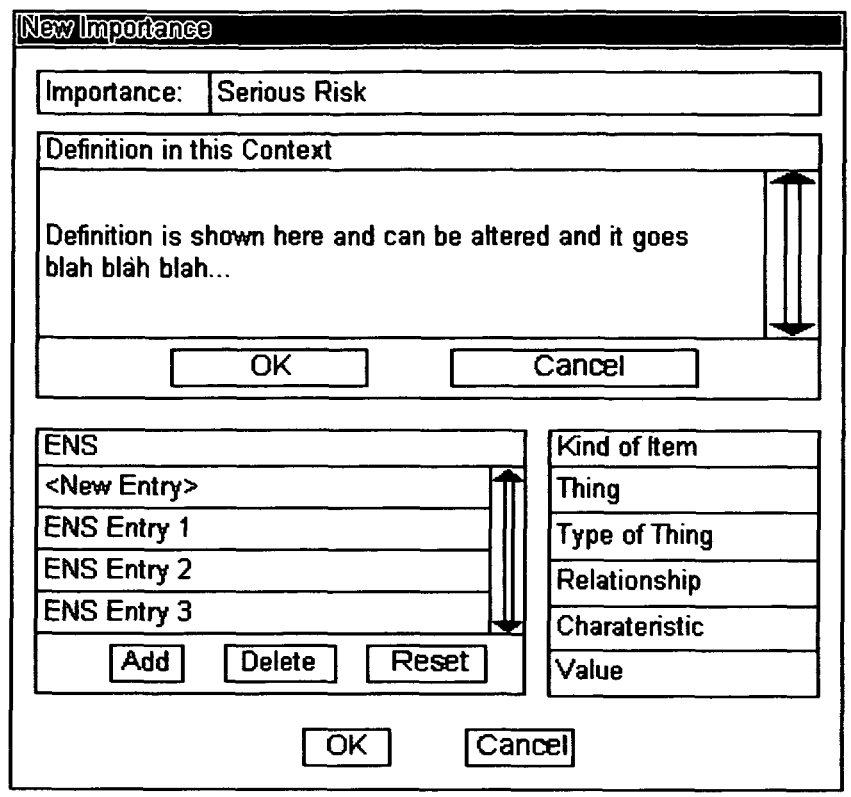
FIG. 4D shows the types of ENS sets, definition of the importance and the kind of item.

FIG. 4D shows the types of ENS sets, definition of the importance and the kind of item.

We claim:

1. A computer-implemented method of generating a set of equivalent declared patterns from each declared pattern in a reading style of a user in a specific language, comprising:
   a computer comprising one or more processors configured to:
   generating a plurality of predetermined equivalent pattern sets, wherein each of said equivalent pattern sets represents a set of linguistic formations representing the grammar constraints of a given language or genre, wherein each of the said equivalent pattern sets individually resolve to the same meaning as represented in an ontology, wherein each of said equivalent pattern sets comprises a specific combination of one or more pattern variables and includes additional terms from the language, wherein each of said equivalent pattern sets comprise
   a plurality of equivalent patterns, wherein each of said equivalent patterns in an equivalent pattern set is a linguistic formation conveying the same meaning and comprise a different arrangement of said specific combination of one or more of said pattern variables and includes the same or different terms from the language, wherein said pattern variables in each of said equivalent patterns are arranged in a relative linguistic sequence, and wherein each of said pattern variables in each of the equivalent patterns comprises a plurality of specified grammar constraints;
   providing a plurality of declared patterns for each sentence in a given language or genre, wherein said declared patterns are determined by providing text in the given language or genre, wherein each of said declared patterns comprises a sequence of linguistic pattern units comprising identified senses of a term in each input phrase or sentence in said provided text;
   feeding each of said declared patterns to a pattern selector for selecting one or more equivalent pattern sets for said declared pattern;
   comparing each of said declared patterns with each pattern in each of said equivalent pattern sets, wherein said declared pattern represents arrangement of said linguistic pattern units of said declared pattern in said sequence, and wherein a match occurs when said relative linguistic sequence and said sequence of at least one of said declared patterns matches with said relative linguistic sequence of one of said equivalent patterns of an equivalent pattern set;
   selecting the matching equivalent pattern set for said declared patterns from said equivalent pattern sets by said pattern selector;
   mapping said pattern variables within said matched equivalent pattern set to the sense of the matching declared pattern units; and
   substituting said pattern variables of each of said equivalent patterns of said matched equivalent pattern set with said matching declared pattern units to generate a set of equivalent declared patterns.

2. A computer-implemented method of applying equivalent declared patterns and equivalent name sets to generate executable semantic pattern recognition rules for use in determining the information of interest from an information source comprising:
   a computer comprising one or more processors configured to:
   inputting said equivalent declared patterns;
   defining a specification of a target rules language format by a target rules language format module;
   providing a library of equivalent name sets;
   reducing said matching declared pattern units of each equivalent declared pattern to semantic items in an ontology, wherein each semantic item represents an equivalent name set, to produce equivalent name set enhanced semantic units; and
   applying said specification of said target rules language format to said equivalent declared patterns containing said equivalent name set enhanced semantic units to generate executable semantic pattern recognition rules by a rules generator.

3. A computer-implemented method of applying executable semantic pattern recognition rules to an information source for identifying the information of interest in said information source for an end user, comprising:
   a computer comprising one or more processors configured to:
   providing said executable semantic pattern recognition equivalent sentence patterns;
   providing said information source;
   identifying the sections of the information source that require processing, wherein said step of identifying is directed by a reading plan of said end user;
   substituting each term in the information source with equivalent name set enhanced semantic units, wherein said term appears in the equivalent name set of said equivalent name set enhanced semantic unit;
   providing a library of equivalent name sets;
   decomposing compound sentences of said equivalent name set enhanced semantic units to generate simplified equivalent name set enhanced semantic units; and
   applying said executable semantic pattern recognition rules to said information
   source with said substituted equivalent name set enhanced semantic units to identify the information of interest.

4. The method of claim 2, further comprising the step of resolving references, comprising the steps of:
   identifying reference items that are words or phrases that require resolution;
   determining if a language specific context contains an equivalent name set substitution for said reference item; wherein said language specific context is created or updated for each identified pattern at run time with the role, number and any other distinguishing factors; and
   substituting said equivalent name set substitution for the reference item.

5. The method of claim 3, wherein the step of providing and applying a specification of the target rules language format to said equivalent patterns, further comprises the step of applying grammar logic using a grammar function signature specification, wherein said grammar function signature specification further comprises:
   an instance-level equivalent name set function that is an interface definition to a function that handles the equivalent name sets;

an instance-level number function that is an interface definition to a function that handles singular and plural forms of a word;

an instance-level reference resolution function that is an interface definition to a function that handles the resolution of pronouns; and an instance-level tense function that is an interface definition to a function that handles the different forms of a verb.

6. The method of claim 2, wherein a semantic unit comprises words, sentences or paragraphs.

* * * * *